May 28, 1946.     G. E. KING ET AL     2,401,164
CONTROL SYSTEM
Filed Dec. 27, 1944
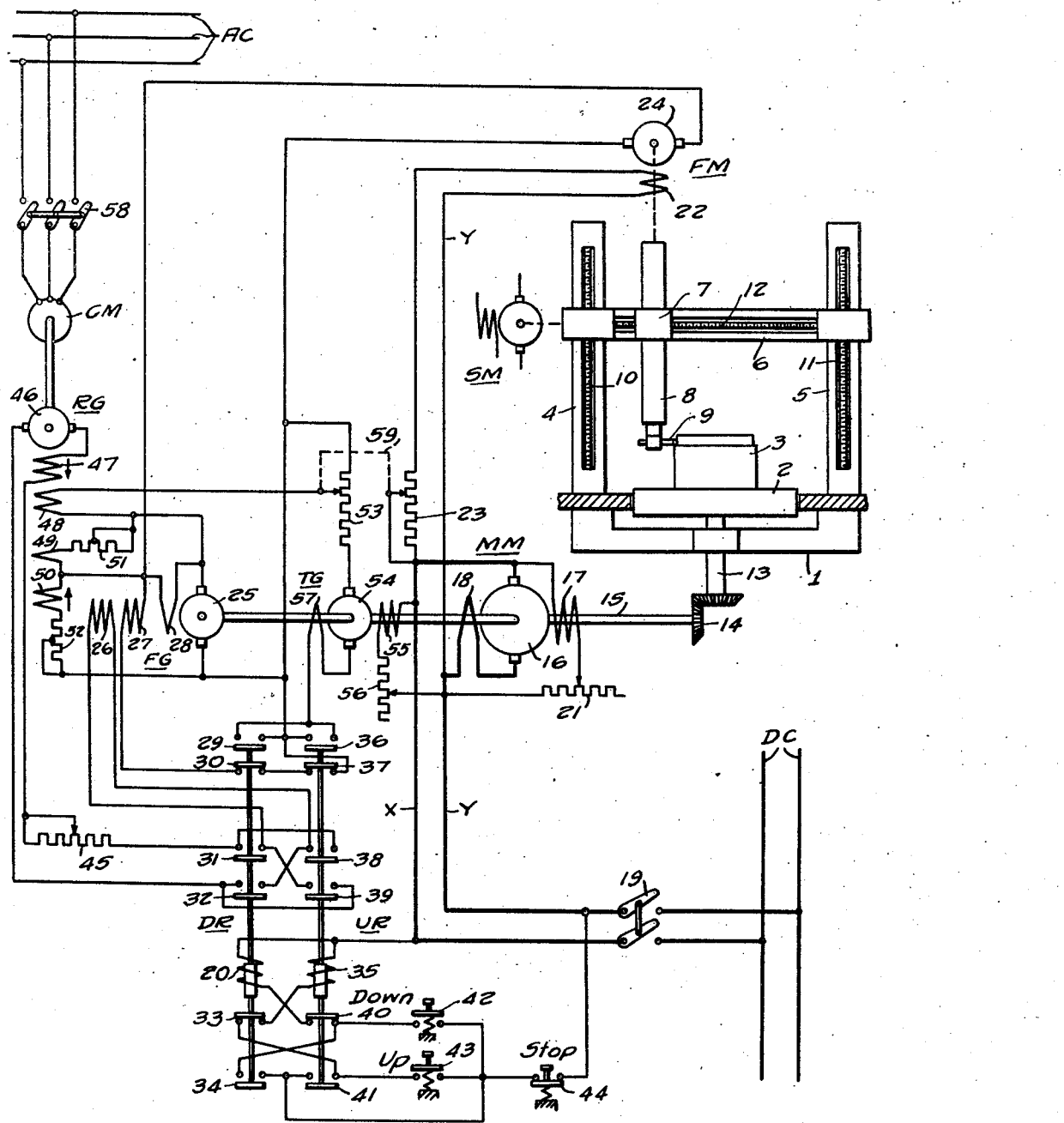
WITNESSES:
INVENTORS
George E. King and
William H. Formhals.
BY
Paul C. Brickmann
ATTORNEY Patented May 28, 1946

2,401,164

UNITED STATES PATENT OFFICE 2,401,164

CONTROL SYSTEM

George E. King, Swissvale, and William H. Formhals, Forest Hills, Pa., assignors to Westinghouse Electric Corporation, East Pittsburgh, Pa., a corporation of Pennsylvania Application December 27, 1944, Serial No. 570,000

6 Claims. (Cl. 172—239)

Our invention relates to electric motor control systems for boring mills, milling machines, veneer lathes, and other machine tools which are applicable for operations that require a constant feed of the tool relative to the workpiece.

For instance, one of the requirements for boring mills is to maintain the same feed per revolution of the spindle or table. On a vertical type mill, the speed of the feed motor must change as the speed of the table motor is changed in order to maintain a constant feed. For instance, if the feed is set for ¼ inch per revolution of the table, then the feed must remain ¼ inch per revolution regardless of changes in the speed of the table. The same condition must hold on a horizontal boring mill between the speed of the boring spindle and the feed motion of the table or spindle. Another requirement concerning the feed conditions on boring mills is to provide some adjusting means which permit varying the amount of feed per revolution of the spindle or table.

It is an object of the invention to provide an electric motor control system for machine tools of the type referred to that permits a substantially continuous adjustment within a wide range of the speed ratio between the main drive motor (table or spindle motor) and the feed motor of the machine, and secures a reliable maintenance of this ratio while performing its functions with the aid of rugged electric machines applicable and reliable under exacting shop conditions and suitable for machine tools up to largest capacities.

According to the invention, the feed motor consists of a separately excited direct-current motor and receives its armature energization from a variable voltage feed generator whose field excitation is controlled by a separate regulating generator operating at constant speed and field-controlled in accordance with a pattern voltage and one or several control voltages. The pattern voltage represents an adjustable proportion of a measuring voltage which varies in accordance with the speed of the feed motor, and the control voltage or voltages function in such a manner that the output voltage of the feed generator, under control by the regulating generator, is maintained at the value necessary to stabilize the feed motor speed in proportion to that of the main drive motor. In order to achieve this result, the feed generator is further controlled in dependence upon the speed of the main drive motor so that changes in speed of the main drive motor cause a corresponding change in speed of the feed motor while maintaining the adjusted ratio of these two speeds.

The invention will be understood from the following description of the embodiment illustrated in the drawing.

The drawing represents a schematic illustration of a boring mill in conjunction with a circuit diagram of the appertaining electric control system. The supporting structure 1 of the machine tool carries a revolvable table 2 for accommodating a workpiece 3 and has two standards 4 and 5 which serve as a guidance for a cross bar 6. The cross bar is vertically displaceable along the standards 4 and 5 and form a guide for a horizontally displaceable saddle 7 for a ram 8 whose lower end carries the tool 9. Two spindles 10 and 11 located within the standards 4 and 5, respectively, serve to raise and lower the cross bar 6. These spindles may be driven by an electric motor (not illustrated). The saddle 7 engages a threaded spindle 12 which extends along the cross bar 6 and is driven by a saddle motor SM. The means for energizing and controlling the saddle motor SM are not illustrated; they may consist of any conventional control arrangement or may be designed in accordance with the control system of the feed motor described hereinafter.

The ram 8 is also provided with a spindle which is driven by a feed motor FM in order to raise and lower the tool relative to the table or workpiece.

The shaft 13 of table 2 is connected by a suitable transmission, here represented by a gear 14, to the shaft 15 of the armature 16 of a main drive motor MM. This main motor has two field windings, denoted by 17 and 18, and is connected by leads X and Y and through a main switch 19 to a direct-current line denoted by DC. Field winding 17 is excited from leads X and Y through an adjusting rheostat 21. Field winding 18 is series-connected with armature 16 between leads X and Y. The speed of motor MM and hence the speed of rotation of table 2 can be adjusted by means of the rheostat 21. If desired, additional or other speed regulating means may be provided for the main drive motor.

The feed motor FM has a separately excited field winding 22 connected to the direct-current leads X and Y through a series-connected rheostat 23. The armature 24 of the feed motor is connected to the armature output terminals of a feed generator FG. The armature of generator FG is denoted by 25 and is acted upon by three field windings 26, 27 and 28, respectively. Winding 28 is series-connected in the armature circuit for providing interpole and compensating fields. The field winding 26 is separately excited and represents the control winding proper of the feed generator. Field winding 27 is arranged for shunt connection relative to the armature 25 and, when energized, acts in opposition to the control field winding 26 at a field strength just sufficient to balance the residual generator field (suicide field winding). The circuit of the suicide field winding 27 and the energizing circuit of the control field winding 26 are controlled by two electromagnetic contactors denoted by DR and UR, respectively. The control coil 20 of contactor DR actuates six contacts denoted by 29 through 34, respectively. Similarly, the contactor UR has a control coil 35 for actuating six contacts, denoted by 36 through 41, respectively. The energizing circuit for coil 20 extends through a push-button contact 42 which is normally biased toward its open position, and the circuit of coil 35 includes a push button contact 43 which is also normally in its open position. The circuits of both coils 20 and 35 include further the above-mentioned contacts 33, 34, 40 and 41 and a normally closed push button 44 is provided to complete the coil circuits between the leads X and Y. Push button 42 serves to start the feed motor in the downward direction while push button 43 serves to start the same motor in the upward direction, both operations being stopped when the push button 44 is actuated.

When both relay DR and UR are inoperative, as shown in the drawing, the suicide field winding 27 of feed generator FG is connected by contacts 30 and 37 across the armature 25 of generator FG. When either button 42 or button 43 is depressed, thereby energizing relay DR or relay UR, one of contacts 30 and 37 will open so that field winding 27 becomes ineffective. Consequently, during the operation of the control system, only the control field winding 26 is in operative condition due to the closure of contacts 31 and 32 or contacts 38 and 39. When at the end of an operating period the stop button 44 is actuated, thereby deenergizing the contactor DR or UR previously in operating condition, the suicide field winding 27 becomes self-excited and hence remains effective during the decelerating period of the feed generator. As a result, the output voltage of the feed generator is rapidly reduced to zero, thereby braking the feed motor FM accordingly.

The above-mentioned contacts 31, 32, 38 and 39 are connected through an adjustable rheostat 45 to the armature 46 of a regulating generator RG. This generator is provided with four field windings, denoted by 47 through 50, respectively. Winding 47 is connected in the armature circuit of generator RG and produces a self-excited field. Field winding 48, hereinafter called the "pattern field winding" is separately excited in a manner to be described hereinafter. Winding 49 serves to compensate for the IR drop in the armature circuit of the feed generator and feed motor and is connected through a calibrating rheostat 51 across the interpole and compensating field winding 28 of the feed genertaor FG. Field winding 50 is connected across the armature 24 of the feed motor through a calibrating rheostat 52 and hence is excited in proportion to the terminal voltage of motor FM. Winding 50 acts in opposition to the self-excited field winding 47 of the regulating generator RF so that the resultant effect of both windings is balanced during steady-state operating conditions of the system. Under such conditions the voltage output of generator RG and, consequently, the excitation of the control field winding 26 of feed generator FG depend only on the excitation supplied to the pattern field winding 48 and on the corrective effect of the compensating winding 49.

The pattern field winding 48 of generator RG lies in a circuit which includes in series the armature 25 of the feed generator and an adjustable portion of a potentiometer rheostat 53. This rheostat is impressed by a voltage which varies in accordance with the speed of the main motor MM. In the illustrated embodiment, the measuring means for producing or controlling the speed responsive voltage consist of a tachometer generator TG whose armature 54 is driven in accordance with the speed of the main motor MM.

Generator TG has a separately excited field winding 55 which receives constant excitation from leads X and Y through a calibrating rheostat 56. A series field winding 57 of the tachometer generator is connected in series with the armature 54 and the potentiometer rheostat 53 under control by the above-mentioned contacts 29 and 36 of contactors DR and UR, respectively. When either contactor is energized and the control system in operation, the armature circuit of the tachometer generator is closed, and the voltage generated in armature 54 and impressed across rheostat 53 is a measure of the speed of motor MM. Consequently, the adjusted portion of the potentiometer voltage drop is also proportional to the main motor speed. The polarity of this voltage drop is so chosen that the resultant excitation impressed on the pattern field winding 48 is a measure of the difference between the armature voltage of the feed generator FG and the speed responsive voltage drop across the adjusted portion of the potentiometer rheostat 53. Thus, the resultant excitation of the pattern field winding 48 is indicative of the speed of the feed motor FM.

When the voltage of the feed generator FG is correct for the exciting current through its control field winding 26, then the flux set up by field winding 50 of regulating generator RG is just utilized by the flux of the self-excited field winding 47. Hence, the oppositely acting and balanceable field windings 50 and 47 tend to maintain the correct voltage of the armature of the feed generator FG for any given setting of the rheostats or speed of the feed generator and tachometer generator.

The regulating generator RG is driven by a motor CM at constant speed. The motor is connected through a switch 58 to a suitable current source, for instance, an alternating-current line as denoted by A. C. The feed generator FG, in addition to the above-described control by generator RG, is also controlled in dependence upon the speed of the main drive motor MM. To this end, the armature 25 of the said generator is connected by a suitable transmission to armature 16 of motor MM. According to a preferred embodiment, and as illustrated in the drawing, the armatures 16, 54, and 25 may be mounted on a common shaft while the regulating generator, also as shown, is separately driven. It will be understood that the generators RG and TG consist of relatively small machines as compared with the feed generator FG. Furthermore, the generators RG and TG operate normally within the unsaturated range of their magnetic characteristic, while generator FG operates normally within the saturated range.

The function of the control system will be more fully understood from the following description of its operation as a whole. In order to start the operation, the switches 19 and 58 are first closed. The regulating generator RG starts running, and the main drive motor MM for operating the table 2 of the machine tool can be started and may be adjusted to the desired speed. The field winding 22 of motor FM receives excitation, but the feed motor remains inoperative because the control field winding 26 of the feed generator is disconnected from the regulating generator RG, and the self-excited suicide field winding 27 is effective to maintain the voltage of armature 25 at zero. In order to operate the feed motor FM for lifting the ram 8, the button 43 is to be depressed by the operator. This completes the energizing circuit of coil 35 through contacts 33, 43, and 44. Contactor UR picks up and closes at 41 a self-holding circuit so that the relay remains energized upon the release of push button 43. At the same time, the circuit of coil 20 is interrupted by the lifted contact 40 so that an inadvertent actuation of push button 42 remains without effect. Contactor UR closes at contact 36 the armature circuit of the tachometer generator RG, and contact 37 interrupts the circuit of the suicide field winding 27. At the same time, the control field winding 26 of the feed generator is connected by contacts 38 and 39 to the armature 46 of regulating generator RG, the connection being of such polarity as to cause the feed generator FG to excite the armature 24 of feed motor FM in the direction necessary for lifting the ram. The lifting operation is stopped when push button 44 is depressed, thereby deenergizing the contactor UR and returning it into the illustrated original condition. When the push button 42 is actuated, a similar operation is initiated except that now the coil 20 of contactor DR is energized and closes a self-holding circuit while opening the interlock contact 33 in the circuit of coil 35. The contactor DR will then disconnect field winding 27 and attach the control field winding 26 to the regulating generator while reversing the polarity of the latter connection, thereby causing a reversal of the feed generator voltage and hence of the running direction of motor FM. Ram and tool are thus lowered until stop button 44 is depressed.

During the operating period of motor FM, the tachometer generator RG and the feed generator FG operate at a speed proportional to that of the table motor MM. Hence, the tachometer voltage measured by the potentiometer rheostat 53 will build up in proportion to the table speed. The voltage generated by the feed generator FG and applied to the armature 24 of the feed motor depends on the speed of the main motor MM and also on the setting of the slider of potentiometer rheostat 53. The speed of feed motor FM depends on the voltage generated by the feed generator FG and also on the setting of the potentiometer rheostat 23 in the circuit of the motor field winding 22. The ratio of speed between motor MM and motor FM is thus determined by the selected adjustment of the two rheostats 23 and 53, and the regulator generator RG is effective to maintain this proportion at the value determined by the rheostat setting. The two rheostats 53 and 23 are preferably connected by a suitable mechanical transmission, here represented schematically by the broken line 59, so that the feed motor is operated at full field when the armature voltage is reduced below a given value. A single handle or wheel may be used for adjusting the two rheostats 23 and 53 and the dial of this manual control may be calibrated to indicate the feed in inches per revolution.

While we have illustrated a control system in which a tachometer generator is used for measuring the speed of the main drive motor, it should be understood that speed responsive devices of other kinds may be used instead for providing a component pattern field voltage in proportion to the main motor speed. It is further possible and within the scope of our invention to drive the feed generator by a separate driving motor at constant speed. To this end, a common motor, such as the one denoted by CM, may be used to drive the armatures of both the feed generator and the regulating generator. We consider it preferable, however, to drive the feed generator directly from the main drive motor, as shown, because this method of speed responsive generator control requires less change in the field flux of the generator field in order to cover a given speed range. For instance, if the table of the machine tool has been operating at three rotations per minute and a feed of ¼ inch per revolution before the table is slowed down to ½ revolution per minute, the speed of the feed generator will automatically slow down, and the speed of the feed motor FM will be reduced accordingly and hence maintain the original feed per revolution. No change in the field currents of the feed generator is necessary to accomplish this automatic regulation in feed. In contrast thereto, if the feed generator is separately driven at a constant speed, then it would be necessary to change the field current of the control field winding 26 in the order of 6 to 1 for maintaining the same feed at the reduced table speed. Such change in field current can be accomplished, for instance, by ganging the rheostat 45 together (not shown) with the adjusting rheostat 21 (or other means) of the main drive motor MM for selecting its operating speed. Then, any change in the speed setting of rheostat 21 will cause a simultaneous change in the setting of rheostat 45 at the ratio necessary to maintain a constant feed.

Systems according to our invention are applicable for any kind of machine or machine tool which requires the speed of one or more motors to change at the same time and in the same proportion as the speed of a main driving motor. For example, a system substantially as described in the foregoing can be applied to a veneer lathe where it is necessary to change the speed of the feed motor which advances the material in a given proportion to the speed of the head-stock motor to maintain a uniform thickness of the veneer.

It will be understood by those skilled in the art that other changes and alterations than those exemplified above can be made in systems according to our invention without departing from the gist of the invention and within the essential features of the invention as set forth in the claims annexed hereto.

We claim as our invention:

1. A control system for machine tools, comprising a main drive motor; a feed motor to operate simultaneously with said main motor at a speed proportional to that of said main motor; a feed generator having an armature electrically connected to said feed motor for supplying variable energization thereto and comprising field winding means for controlling said energization; means for controlling said feed generator in accordance with the speed of said main motor; a regulating generator having an armature electrically connected to said field winding means and comprising a pattern field winding, a compensating field winding, and two regulator field windings acting in opposition to each other so as to be balanced under steady-state operating conditions; a tachometer generator mechanically connected to said main motor to generate a voltage in proportion to the speed of said main motor; an adjustable potentiometer connected across said tachometer generator; said pattern field winding being connected in series with said armature of said feed generator and also in series with an adjusted portion of said potentiometer so as to be excited in accordance with the difference between the armature voltage of said feed generator and the voltage drop across said portion of said potentiometer; one of said regulator field windings being connected with said armature of said regulating generator so as to be self-excited; said other regulator field winding being connected across said armature of said feed generator; and said compensating winding being connected to said feed generator for compensating the IR drop in the armature circuit of said feed generator.

2. A control system for machine tools, comprising a main drive motor; a feed motor to operate simultaneously with said main motor and at a speed proportional to that of said main motor; a feed generator having an armature electrically connected to said feed motor for supplying variable energization thereto and comprising field winding means for controlling said energization; means for controlling said feed generator in accordance with the speed of said main motor; a regulating generator having an armature electrically connected to said field winding means and comprising a pattern field winding, a compensating field winding, and two regulator field windings acting in opposition to each other so as to be balanced under steady-state operating conditions; speed-responsive measuring means connected with said feed motor for providing a voltage varying in proportion to the speed of said feed motor; said pattern field winding being connected with said armature of said feed generator and also with said measuring means so as to be excited in accordance with the difference between two voltages which are respectively proportional to the armature voltage of said feed generator and proportional to the voltage measured by said means; one of said regulator field windings being connected with said armature of said regulating generator so as to be self-excited; said other regulator field winding being connected across said armature of said feed generator; and said compensating winding being connected to said feed generator for compensating the IR drop in the armature circuit of said feed generator.

3. A control system for machine tools, comprising a main drive motor; a feed motor to operate simultaneously with said main motor and at a speed proportional to that of said main motor; a feed generator having an armature electrically connected to said feed motor for supplying energization thereto and comprising a separately excited field winding for controlling said energization; means for controlling said feed generator in accordance with the speed of said main motor; a regulating generator having an armature electrically connected to said separately excited field winding and comprising a pattern field winding and two regulator field windings acting in opposition to each other so as to be balanced under steady-state operating conditions, speed-responsive measuring means connected with said feed motor for providing a voltage varying the proportion to the speed of said feed motor; said pattern field winding being connected with said armature of said feed generator and also with said measuring means so as to be excited in accordance with the difference between two voltages which are respectively proportional to the armature voltage of said feed generator and proportional to the voltage measured by said means; one of said regulator field windings being self-excited and series connected with said separately excited field winding of said feed generator; and said other regulator field winding being connected across said armature of said feed generator.

4. A control system for machine tools, comprising a main drive motor; a feed motor to operate simultaneously with said main motor and at a speed proportional to that of said main motor; a feed generator having an armature electrically connected to said feed motor for supplying variable energization thereto and comprising field winding means for controlling said energization; a regulating generator having an armature electrically connected to said separately excited field winding and comprising a pattern field winding and two regulator field windings acting in opposition to each other so as to be balanced under steady-state operating conditions; a tachometer generator having an armature for generating a voltage in proportion to the speed of said main motor; said three armatures of said feed generator, regulating generator and tachometer generator being mechanically connected with said main motor, said pattern field winding being connected with said armature of said feed generator and also with said measuring means so as to be excited in accordance with the difference between two voltages which are respectively proportional to the armature voltage of said field generator and proportional to the voltage generated by said tachometer generator; one of said regulator field windings being connected with said armature of said regulating generator so as to be self-excited; said other regulator field winding being connected across said armature of said feed generator.

5. A control system for machine tools, comprising a main drive motor, a feed motor to operate simultaneously with said main motor and at a speed proportional to that of said main motor; a feed generator having an armature electrically connected to said feed motor for supplying variable energization thereto and comprising field winding means for controlling said energization; means for controlling said feed generator in accordance with the speed of said main motor; a regulating generator having an armature electrically connected to said separately excited field winding and comprising a pattern field winding and two regulator field windings acting in opposition to each other so as to be balanced under steady-state operating conditions; reversing contact means disposed between said armature of said regulating generator and said field winding means of said feed generator for selectively reversing the polarity of said winding means in order to reverse said feed motor; speed-responsive measuring means connected with said feed motor for providing a voltage varying in proportion to the speed of said feed motor; said pattern field winding being connected with said armature of said feed generator and also with said measuring means so as to be excited in accordance with the difference between two voltages which are respectively proportional to the armature voltage of said feed generator and proportional to the voltage measured by said means; one of said regulator field windings being connected with said armature of said regulating generator so as to be self-excited; said other regulator field winding being connected across said armature of said feed generator.

6. A control system for machine tools, comprising a main drive motor; a feed motor to operate simultaneously with said main motor and at a speed proportional to that of said main motor; said feed motor having an armature and a separately excited field winding; current supply means comprising an adjustable circuit member for supplying adjustable excitation to said field winding; a feed generator having an armature connected to said armature of said feed motor for supplying variable energization thereto and comprising field winding means for controlling said energization; means for controlling said feed generator in accordance with the speed of said main motor; a regulating generator having an armature electrically connected to said separately excited field winding and comprising a pattern field winding and two regulator field windings acting in opposition to each other so as to be balanced under steady-state operating conditions; electric measuring means connected with said feed motor for providing a voltage in proportion to the speed of said feed motor and comprising potentiometric means for adjusting said proportion; said potentiometric means and said adjustable circuit member being interconnected so that their respective adjustments are correlated to each other, said pattern field winding being connected with said armature of said feed generator and also with said measuring means so as to be excited in accordance with the difference between two voltages which are respectively proportional to the armature voltage of said feed generator and proportional to the voltage measured by said means; one of said regulator field windings being connected with said armature of said regulating generator so as to be self-excited; said other regulator field winding being connected across said armature of said feed generator.

GEORGE E. KING.
WILLIAM H. FORMHALS.